April 21, 1970  R. G. YOUNG  3,508,103
LAMINATED METAL-GLASS PANEL FLUORESCENT LAMP
Filed March 7, 1967  2 Sheets-Sheet 1

WITNESSES:
Leon M. Garman
James F. Young

INVENTOR
Robert G. Young
BY
D. S. Buleza
AGENT

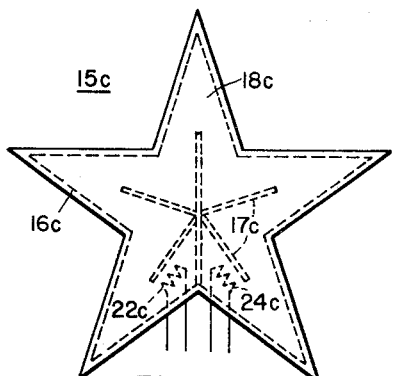
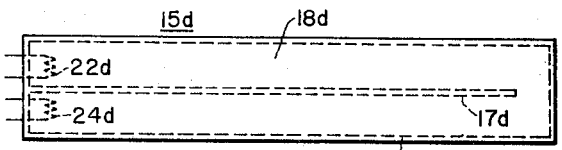
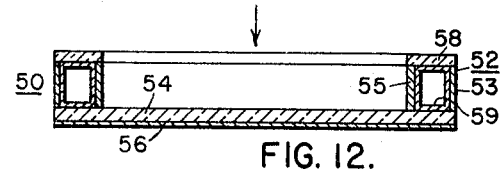
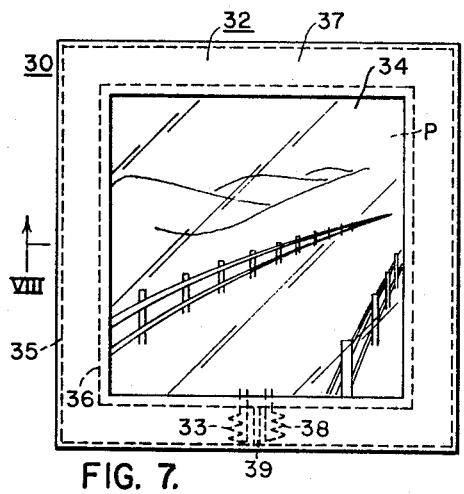
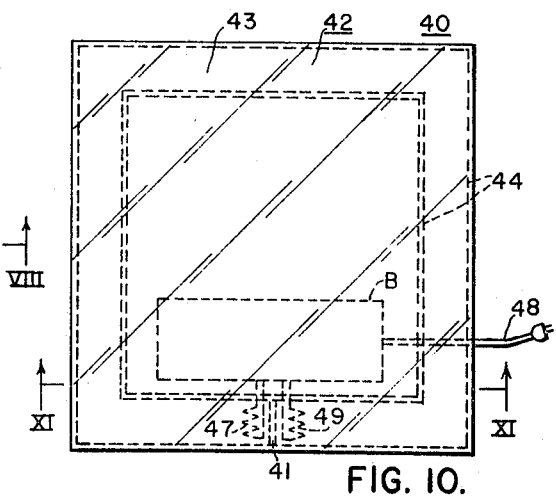
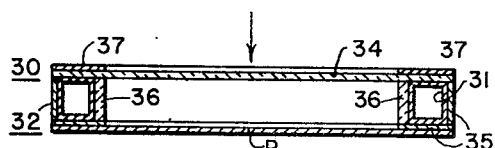
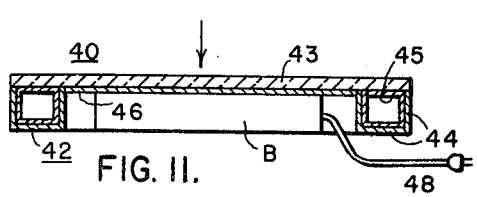
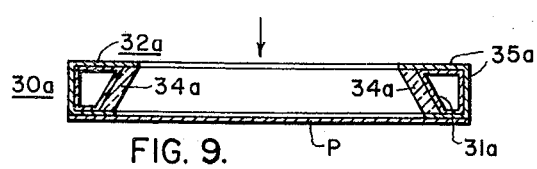

United States Patent Office 3,508,103
Patented Apr. 21, 1970

3,508,103
LAMINATED METAL-GLASS PANEL FLUORESCENT LAMP
Robert G. Young, Nutley, N.J., assignor to Westinghouse Electric Corporation, Pittsburgh, Pa., a corporation of Pennsylvania
Filed Mar. 7, 1967, Ser. No. 621,322
Int. Cl. H01j *1/62, 63/04*
U.S. Cl. 313—109        11 Claims

ABSTRACT OF THE DISCLOSURE

A preformed core assembly of sheet metal or glass having closed sides is sealed in sandwiched relationship between two vitreous plates one of which is light transmitting. The inner surfaces of the core assembly and plates are coated with phosphor and the resulting envelope is evacuated, mercury-dosed and charged with a fill gas through a glass tube that is sealed through a side wall of the core assembly. Partitions and various structural modifications are employed to provide planar fluorescent lamps with tortuous discharge paths and lamps of frame-like configuration for edge lighting pictures, mirrors and the like.

BACKGROUND OF THE INVENTION

This invention relates to gaseous discharge lamps and has particular reference to planar fluorescent lamps adapted for general lighting or edge-lighting applications.

Planar fluorescent lamps having partitions that define a labyrinthine discharge channel are well known in the art. Heretofore, the envelopes for such lamps have been formed by sealing two molded glass pieces together along their edges or by sealing a flat plate of glass to a single molded glass member. An all glass panel fluorescent lamp of this type is illustrated and described in U.S. Patent No. 3,047,763 issued to G. E. Inman on July 31, 1962.

According to another design, the planar envelope is formed by sealing a flat cover glass to a bowl-like housing of sheet metal having an attached partition that forms the desired discharge channel. A lamp of this construction is disclosed in U.S. Patent No. 2,405,518 issued Aug. 6, 1946 to I. B. Polevitzky.

Because of the complex configuration of the molded glass members and metal housings, the prior art panel fluorescent lamps are expensive and difficult to manufacture. The cost of the molded glass members and stamped metal housings are quite high and it is difficult to seal the components together without introducing strains that weaken the envelope.

SUMMARY OF THE INVENTION

It is accordingly the general object of the present invention to provide an improved low-pressure gaseous discharge lamp of planar configuration that can be readily and inexpensively manufactured.

Another and more specific object is the provision of a panel fluorescent lamp that is sturdy, of simple construction and which can be fabricated on a mass production basis in a variety of shapes and sizes.

Still another object is the provision of panel fluorescent lamps that can be readily manufactured and attractively and effectively provide edge-lighting for pictures or mirrors, etc. which form integral parts of the lamp structure.

The foregoing and other objects and advantages are achieved in accordance with the present invention by forming a core assembly from flat pieces of sheet metal (or glass), placing it in sandwiched upstanding relationship between two flat pieces of glass, and then heating the resulting lamination to a sufficiently high temperature to seal the components together and form a hermetically sealed envelope. The sides of the sheet metal core are closed and constitute the side walls of the flat panel envelope. The electrodes are sealed through the sides of the sheet metal core along with a glass tubulation which permits the lamp to be evacuated, mercury-dosed and gas filled in the usual fashion. Upstanding partitions attached to the sides of the sheet metal core abut against the inner surfaces of the glass plates and provide a tortuous discharge channel. Thus, lamps of various sizes and configurations may be made simply by cutting glass and sheet metal components of the proper dimensions. The inner surfaces of the glass plates and the partitioned sheet metal core assembly are coated with phosphor so that both faces of the lamp are uniformly and brightly lighted.

Alternative lamp embodiments wherein the envelope is made in the form of a closed frame having a central opening for edge lighting a picture mounted in the opening, or a mirror that covers the opening, are also provided.

BRIEF DESCRIPTION OF THE DRAWING

A better understanding of the invention will be obtained by referring to the accompanying drawing, wherein:

FIGS. 3 to 6 are alternative forms of panel fluorescent lamps;

FIGS. 7 and 8 are plan and cross-sectional views, respectively, of another embodiment wherein the planar lamp constitutes a rectangular frame for edge lighting a painting or the like mounted therein;

FIG. 9 is a cross-sectional view of another form of panel fluorescent lamp for edge-lighting a picture or the like;

FIGS. 10 and 11 are plan and cross-sectional views; respectively, of a mirror-lamp combination wherein the versatile planar lamp configuration of the present invention is used to light the periphery of the mirror; and FIG. 12 is another form of lamp-mirror combination wherein the viewing face of the mirror is uniformly illuminated by an encircling planar fluorescent lamp.

While the present invention can be used with advantage in manufacturing various types of low-pressure discharge devices such as germicidal lamps or glow lamps, it is particularly adapted for use in conjunction with fluorescent lamps and has accordingly been so illustrated and will be so described.

EMBODIMENT I

Figure 1:
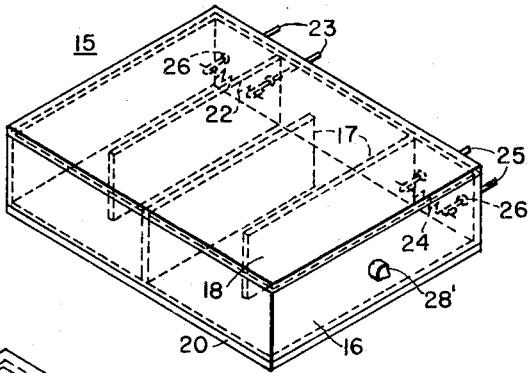
FIGURE 1 is a pictorial view of a rectangular metal-glass panel fluorescent lamp embodying the present invention.

In FIG. 1 there is shown a panel fluorescent lamp 15 having a flat rectangular envelope formed by a sheet metal core 16 that has closed sides and is sealed along its peripheral edges to a pair of glass sheets or plates 18, 20. The sheet metal core assembly 16 has a plurality of upstanding partitions 17 attached to its side walls which partitions are so spaced and interleaved that they define, together with the glass plates 18, 20, an elongated sinuous discharge channel that begins at the upper right-hand corner of the lamp (as viewed in FIG. 1) and ends at the upper left-hand corner. A pair of electrodes, such as thermionic cathodes 22 and 24, are located at the aforementioned corners of the lamp and are held in such position by pairs of lead wires 23, 25 that are sealed through and insulated from the side wall portions of the sheet metal core 16 by beads 26 of solder glass or the like. The lead-in wires, glass beads and cathodes when assembled form integral electrode mounts. The envelope is evacuated, dosed with mercury and filled with a suitable ionizable gas, such as argon or the like, through a glass tubulation 28 (see FIG. 2) that is sealed through another side wall portion of the sheet metal core 20 with solder glass, which tubulation is then tipped-off at a point close to the envelope leaving a short tip 28'.

Figure 2:
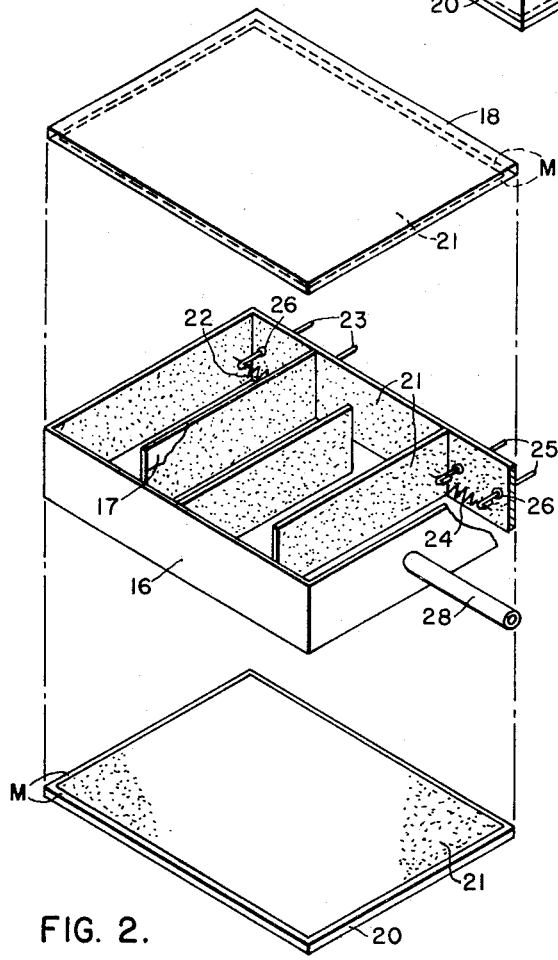
FIG. 2 is an exploded view of the sheet metal core assembly and glass cover plates utilized in constructing the lamp shown in FIG. 1.

As shown more particularly in FIG. 2, the inner surfaces of the glass plates 18 and 20, the inner surfaces of the sides of the metal core 16 and both sides of the partitions 17 are coated with a layer 21 of a suitable phosphor that emits light in response to the ultraviolet radiation generated by the mercury discharge. As will be noted, phosphor-free margins M are provided along the edges of the plates 18 and 20 to insure that a good seal is effected between the plates and the abutting peripheral edges of the metal core 16.

An important feature of the invention resides in the fact that the edges of the partitions 17 merely abut against but are not sealed to the inner surfaces of the cover plates 18 and 20. The phosphor coating 21 is thus deposited on the plates in a continuous layer which, in turn, insures that both faces of the lamp 15 will be uniformly and brightly lighted when the lamp is energized. Experience has shown that when the partitions are sealed to the glass cover plates with solder glass, the resulting obliteration of the phosphor coating produces unsightly dark lines or streaks that extend across the face of the lamp and are objectionable especially when the lamp is lighted.

As a specific example of suitable materials and manufacturing parameters, a compact panel fluorescent lamp of the type shown in FIG. 1 and suitable for use as a dome light in a car was made by using two sheets of lime glass 2" by 2½" and 0.070" thick. The metal core was fabricated from flat strips of nickel-iron alloy ½" wide and 0.005" thick that were bent and welded together into the configuration shown in FIGS. 1 and 2. Oxide coated tungsten cathodes of the type used in conventional 8-watt fluorescent lamps were employed and supported in position by glass-beaded lead wires, the inner portions of which were composed of nickel, and the outer portions of which were composed of copper. The glass exhaust tube had an outside diameter of 0.149". The abutting peripheral edges of the glass plates and core assembly were hermetically sealed together by means of solder glass that was admixed with a nitrocellulose lacquer and painted onto the metal-glass boundries before the components were assembled. Sealing was accomplished by heating the laminated "sandwich" assembly to 600° C. for five minutes to melt the solder glass. After it cooled, the resulting envelope was substantially strain-free and it withstood a 150 lb. load without breaking. The lamp was then filled with 3 torr of argon and some mercury. Lamp voltage was 52 volts at 200 ma.

Lamps of much larger dimension can, of course, be made simply by cutting the glass to size and proportionately increasing the sizes of the other components.

METHOD OF MANUFACTURE

The method of manufacturing a laminated metal-glass panel fluorescent lamp in accordance with this invention is quite simple and will now be described. The sheet metal core assembly 16 is first formed and coated with phosphor. The exhaust tubulation 28 and electrode mounts are then inserted into properly located apertures in the sides of the core assembly and retained therein by a filling of a paste-like mixture of solder glass and a suitable binder. The glass cover plates 18, 20 are then cut to size and the inner surfaces thereof coated with phosphor 21, except for the narrow margins M that extend around the peripheries of the plates. A layer of solder glass paste is then painted onto the peripheral edges of the core assembly 16 and/or the phosphor-free margins M of the glass plates 18, 20, and the components are arranged in sandwiched relationship and the entire structure placed into an oven and heated to a sufficiently high temperature to melt the solder glass.

The resulting integral partly-fabricated lamp is then allowed to cool slowly to a predetermined lower temperature and exhausted through the glass tubulation 28. After the lamp has cooled to room temperature it is dosed with a predetermined amount of mercury and filled with a suitable starting gas such as argon or neon at approximately 3 torr, after which the tubulation is tipped-off. As will be apparent, each of the assembly operations are quite simple and can easily be performed automatically by suitable machines, thus permitting the lamps to be manufactured on a continuous mass-production basis.

EMBODIMENT II

Figure 3:
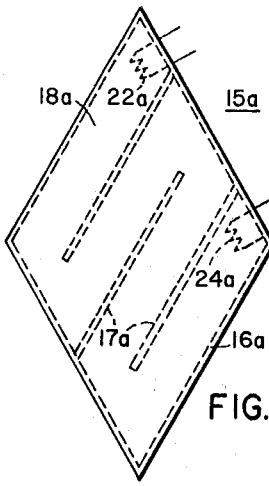

In FIG. 3 there is shown another lamp embodiment 15a that is identical in all respects to the rectangular planar lamp 15 described above except that glass cover plates 18a, 20a (latter not shown) and metal core assembly 16a are so configured that the completed lamp is diamond-shaped. As illustrated, the interleaved partitions 17a are suitably tilted so as to remain parallel with the sides of the envelope and with each other.

EMBODIMENT III

Figure 4:
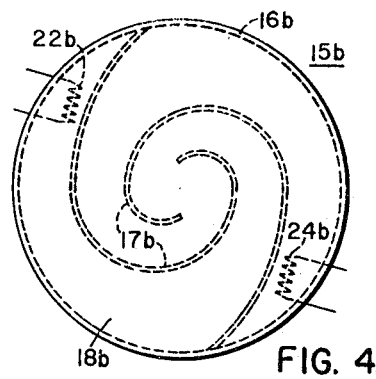

In FIG. 4 there is shown another lamp embodiment 15b which is of cylindrical configuration and has spiral shaped partitions 17b that are so arranged that the discharge path follows a retroverted helical path. The lamp 15b is identical in all other aspects to the lamp 15 previously described.

EMBODIMENT IV

In FIG. 5 there is shown a planar fluorescent lamp 15c of the same basic design except that it is constructed in the shape of a 5-pointed star. The discharge channel is of corresponding configuration and is defined by a plurality of partitions 17c that radially extend from the center of the lamp toward and into each of the pointed segments of the envelope.

EMBODIMENT V

In FIG. 6 there is shown another embodiment wherein the lamp 15d is of elongated rectangular configuration and is provided with a longitudinally extending partition 17d that forms a U-shaped discharge channel. The electrodes 22d and 24d are disposed on opposite sides of the partition at the same end of the envelope.

EMBODIMENT VI

In FIGS. 7 and 8 there is shown another embodiment 30 consisting of a planar fluorescent lamp 32 that is constructed in the form of a rectangular shaped frame having a central opening that is covered by a glass face plate 34 and has a painting P mounted therein below the face plate.

As is shown more particularly in FIG. 8, the face plate 34 extends to the edge of the lamp 32 and forms one of the four wall sof the envelope. The bottom and outer side walls of the envelope are formed from an integral piece of sheet metal 35 the edges of which are sealed to the edge of the face plate 34 and to flat strips of glass 36. The glass strips 36 are in turn, sealed to the face plate 34 and form the inwardly disposed wall of the envelope that encircles the rectangular opening defined by the lamp 32. The inner surfaces of the conjoined glass and metal components that define the discharge channel are coated with a layer 31 of phosphor. The channel is terminated at a preselected point by a transverse partition 39 (FIG. 7) and electrodes 33, 38 are mounted on opposite sides of the partition.

The picture P is mounted across the back of the lamp 32 (see FIG. 8) and is uniformly lighted by light rays passing through the inner side-wall portions 36 when the lamp is energized. The peripheral edge portions of the face plate 34 that constitute parts of the lamp envelope are covered with an opaque coating 37 of suitable material so that the lamp looks like a picture frame when viewed in the direction of the arrow shown in FIG. 8. All of the emitted light is directed onto the picture P from around its edges.

A modified picture-lamp combination 30a is shown in FIG. 9. In this embodiment, the rectangular-frame lamp 32a has an envelope that is constructed from an integral piece of sheet metal 35a that is of U-shaped cross-section and sealed to flat pieces of glass 34a that complete the envelope and are tilted at an angle toward the picture P attached to the back of the lamp. The front of the rectangular lamp 32a is left open so that the picture P can be viewed directly through the opening, as indicated by the arrow in FIG. 9. The inner surfaces of the envelope are, of course, coated with phosphor 31a as before.

EMBODIMENT VII

In FIGS. 10 and 11 there is shown a lamp-mirror combination 40 which utilizes the concepts of the present invention. As illustrated, the planar fluorescent lamp 42 is constructed in the form of a rectangular frame as before and is covered with a glass face plate 43. As shown more particularly in FIG. 11, the peripheral edges of the face 43 are hermetically sealed to a metal strip 44 of U-shaped cross-section and together therewith forms the envelope and the discharge channel. The inner surfaces of the face plate and metal strip that define the aforesaid channel are coated with a phosphor layer 45. The surface of the cover plate 43 facing the opening defined by the rectangular lamp 42 is coated with reflective material 46 and thus constitutes a mirror when viewed in the direction of the arrow shown in FIG. 11. A ballast B is recessed within the aforesaid opening at the back of the mirror and thus provides a self-contained unit that can be hung on a wall and operated by plugging in the power core 48.

As shown in FIG. 10, the discharge channel is sealed off at a predetermined point by a transverse partition 41 and cathodes 47 and 49 are mounted within the envelope on opposite sides of the partition so that the discharge encompasses the mirror and provides a bright uniformly-illuminated "frame of light" when the lamp is energized.

EMBODIMENT VIII

In FIG. 12 there is shown another mirror-lamp embodiment 50 that is designed for cosmetic purposes such as shaving, applying make-up and dyeing or setting hair, etc. According to this embodiment, the panel fluorescent lamp 52 is again constructed in the form of a rectangular frame. It is, however, mounted on the front face of the mirror consisting of a flat piece of glass 54, the rear surface of which is silverized or coated with suitable reflective material 56. A pair of metal strips 53 and 55 are hermetically sealed to the periphery of the glass plate 54 and to flat strips of glass 58 and together therewith form the lamp envelope. The inner portions of the aforesaid metal and glass strips are coated with a phosphor layer 59 and provide a discharge channel of square cross-section. Thus, when the mirror is viewed in the direction of the arrow, the viewer is uniformly lighted by the "frame of light" and the desired cosmetic chores can be performed without any troublesome shadows.

It will be appreciated from the foregoing that the objects of the invention have been achieved in that a very inexpensive metal-glass panel fluorescent lamp has been provided which can be conveniently and quickly fabricated. The novel construction affords a versatility as regards the size and shape which, together with the inherent thinness of the completed lamp, permits the lamp to be used as a free-hanging decorative light source, work or step light, swimming pool light, in a modular-type animated sign board, or as a traffic light, highway light, etc. In addition, a preferred method for efficiently manufacturing the aforesaid panel lamps and incorporating them as integral parts of the picture frames or mirrors to meet the requirements of specialized lighting applications have also been provided.

While various lamp embodiments and a preferred method of manufacture have been illustrated and described, it will be appreciated that various modifications can be made without departing from the spirit and scope of the invention. For example, the metal core assembly can be heated and sealed directly to the glass plate to eliminate the use of solder glass, and metal tabs and brackets may be spot-welded to the core to provide a convenient means for mounting or hanging the lamp.

In addition, the cosmetic lamp shown in FIG. 12 can be made in various other shapes in addition to the rectangular configuration described, as for example, oval, circular, diamond, heart, etc., and the picture frame-lamp embodiment shown in FIGS. 7–9 can also be made as a self-standing unit by attaching a suitable support to the back of the picture or lamp.

Last but not least, the core assembly need not be made of sheet metal but can be fabricated from flat pieces of glass joined together with solder glass. In this case, the lamp will be of all-glass construction and the costly molded glass components heretofore employed will, of course, be eliminated.

I claim as my invention:

1. A fluorescent lamp comprising:
    a pair of substantially flat plates at least one of which is light-transmitting and has a continuous layer of phosphor on one face thereof,
    a preformed core member that has closed sides and is disposed in upstanding sandwiched relationship between said plates,
    said core member having an upstanding partition that is integral with and extends laterally from a side wall of said core member and said plates being arranged so that the phosphor layer is disposed on the inner face of the associated plate,
    the side walls of said core member being hermetically joined to said flat plates and said partition being disposed in abutting but unsealed relationship with said plates thereby providing a sealed planar envelope which defines an elongated discharge channel and has a light-emitting face that is interiorly coated with a continuous layer of phosphor,
    anionizable medium within said envelope,
    an electrode located at each end of said discharge channel, and means supporting said electrodes in the aforesaid position.

2. The lamp set forth in claim 1 wherein said core member comprises a plurality of flat pieces of glass that are joined together with solder glass.

3. The lamp set forth in claim 1 wherein said core member is fabricated from sheet metal.

4. The fluorescent lamp set forth in claim 3 wherein;
    said light-transmitting plate comprises a vitreous member,
    said sheet metal core member is sealed to said vitreous plate,
    the ionizable medium includes a predetermined amount of mercury, and
    the inner surfaces of said sheet metal core member are also coated with a layer of phosphor.

5. The fluorescent lamp as set forth in claim 4 wherein;
    said plates comprise sheets of glass,
    the peripheral edges of said sheet metal core member are sealed to the overlying parts of the respective glass sheets,
    said electrodes are supported within the envelope by mount structures that are sealed through a side wall portion of said core member at opposite ends thereof,
    the inner surfaces of both of said glass sheets are covered with a continuous layer of phosphor so that both faces of the envelope are uniformly lighted when the lamp is energized, and said core member includes a tipped-off exhaust tubulation that is hermetically sealed through a side wall portion of the core member.

6. The planar fluorescent lamp set forth in claim 5 wherein;

the envelope formed by said glass sheets and metal core member is of generally rectangular configuration, said core member includes a plurality of spaced interleaved partitions that define a tortuous discharge channel, said electrodes are supported at the ends of said channel by lead-in conductors that are sealed through and insulated from the associated side wall portion of said metal core member by fillings of fused solder glass, and the peripheral edges of said sheet metal core member and glass sheets are sealed together by fused solder glass.

7. A planar fluorescent lamp comprising;

a plurality of glass and sheet metal members that are joined together and form a sealed envelope of closed frame-like configuration having a central opening and a single elongated discharge channel which extends around said opening, a partition extending across and closing off said discharge channel, a pair of electrodes disposed on opposite sides of said partition, an ionizable medium including a quantity of mercury within said envelope, and a phosphor coating on the interior surfaces of said glass and sheet metal members that define the aforesaid discharge channel.

8. The planar fluorescent lamp set forth in claim 7 wherein only the inwardly-disposed sidewall portions of said envelope that face the central opening are light-transmitting.

9. The lamp set forth in claim 7 wherein;

a glass plate covers said central opening and extends to the peripheral edges of said lamp, and the peripheral portions of said glass plate constitute integral parts of the lamp envelope.

10. The lamp set forth in claim 9 wherein;

said glass cover plate comprises a mirror the reflective coating whereof is disposed on the side of the glass plate opposite the central opening, and the walls of said envelope opposite said mirror are also fabricated from glass and are light transmissive.

11. The lamp set forth in claim 9 wherein;

the glass cover plate comprises a mirror the reflective coating whereof covers the side of the mirror which is co-extensive with and faces the central opening, and ballast means for said lamp is disposed in the central opening behind the mirror.

References Cited

UNITED STATES PATENTS

| | | | |
|---|---|---|---|
| 2,268,351 | 12/1941 | Tanaka | 350—128 |
| 2,406,146 | 8/1946 | Holmes | 313—109 X |
| Re 22,896 | 7/1947 | Polevitzky | 313—109 |
| 2,446,712 | 8/1948 | McIlvaine | 313—109 X |
| 2,501,376 | 3/1950 | Breadner et al. | 313—109 X |
| 2,919,361 | 12/1959 | Tschakert | 313—109 X |
| 2,933,648 | 4/1960 | Bentley | 313—109 X |
| 3,038,771 | 6/1962 | Schwartz et al. | 240—4.1 X |
| 3,226,590 | 12/1965 | Christy | 313—109 |
| 3,247,415 | 4/1966 | Martyny | 313—109 |
| 2,985,787 | 5/1961 | Scott | 313—109 |
| 2,987,640 | 6/1961 | Paolino | 313—109 |
| 3,177,345 | 4/1965 | Plumat | 313—109 |

JAMES W. LAWRENCE, Primary Examiner

D. O'REILLY, Assistant Examiner

U.S. Cl. X.R.

240—1, 4.1